United States Patent [19]

Kuznetsov et al.

[11] Patent Number: 4,581,555
[45] Date of Patent: Apr. 8, 1986

[54] HOMOPOLAR DYNAMOELECTRIC MACHINE WITH A SHIELDED STATOR EXCITATION COIL

[75] Inventors: Stephen B. Kuznetsov, Washington, D.C.; Lee A. Kilgore, Murrysville, Pa.

[73] Assignee: Westinghouse Electric Corp., Pittsburgh, Pa.

[21] Appl. No.: 677,768

[22] Filed: Dec. 3, 1984

[51] Int. Cl.[4] .............................................. H02K 31/00
[52] U.S. Cl. ..................................... 310/178; 310/219; 310/256
[58] Field of Search .............. 310/178, 102 R, 102 A, 310/256, 232, 254, 219; 318/253; 322/48

[56] References Cited

U.S. PATENT DOCUMENTS

| | | | |
|---|---|---|---|
| 2,134,510 | 11/1938 | Hague | 322/48 |
| 3,539,852 | 11/1970 | Appleton et al. | 310/178 |
| 3,639,793 | 2/1972 | Appleton et al. | 310/178 |
| 4,110,648 | 8/1978 | Stillwagon | 310/219 |
| 4,151,455 | 4/1979 | Janotik | 322/48 |
| 4,271,369 | 6/1981 | Stillwagon | 310/178 |
| 4,385,251 | 5/1983 | Mallick et al. | 310/178 |
| 4,401,986 | 8/1983 | Trenkler | 336/84 M |

FOREIGN PATENT DOCUMENTS

| | | | |
|---|---|---|---|
| 0008791 | 3/1980 | European Pat. Off. | 310/178 |
| 0904131 | 2/1982 | U.S.S.R. | 310/256 |

*Primary Examiner*—R. Skudy
*Attorney, Agent, or Firm*—R. P. Lenart

[57] ABSTRACT

A drum-type homopolar dynamoelectric machine includes a rotor and an annular field coil encircling a portion of the rotor. The field coil is supported by a stator structure having a main pole piece for directing magnetic flux produced by current flowing in the coil, radially into a section of the rotor. A current transfer assembly makes sliding electrical contact with a current collecting zone on the surface of the rotor and is axially positioned between the main pole piece and an end pole piece of the stator which directs magnetic flux axially out of the end of the rotor. A magnetic flux shield is positioned adjacent to the field coil to minimize leakage flux, caused by current flowing in the field coil, in the vicinity of the current collecting zone of the rotor. This reduces undesirable circulating currents in the rotor current collecting zone and the associated current collecting brushes.

9 Claims, 7 Drawing Figures

HOMOPOLAR DYNAMOELECTRIC MACHINE WITH A SHIELDED STATOR EXCITATION COIL

BACKGROUND OF THE INVENTION

This invention relates to dynamoelectric machines and more particularly to drum-type homopolar machines.

Drum-type homopolar dynamoelectric machines include a stationary excitation system and a rotating drum composed of a combination of ferromagnetic and highly conductive materials configured such that a direct current output voltage is produced along the axial length of the drum. These machines incorporated a set of current collection members at either axial end of the rotor which carries full load current. Homopolar dynamoelectric machines may operate as either a motor or generator and are particularly suited to transfer energy in short, high-current pulses to a storage inductor and a final load consisting of a resistive-inductive system, as for example, an electromagnetic launcher. The rotor of drum-type homopolar machines may include a cylindrical shell of a highly conductive, non-ferromagnetic material which generates and supports the full load current. This member is bonded or shrunk onto a ferromagnetic inner cylindrical core which serves as the main rotor body and is directly attached to a drive or input shaft. Both components of the rotor are, preferably, homogeneous materials without segmentation or any combination of axial or circumferential grooves. It is imperative that the rotor surface on the two axial ends be smooth since this zone is used exclusively for current collection with, for example, solid metal-graphite brushes. The machine's internal electromotive force is confined to an axial zone along the center of the rotor between the two outer current collection zones.

Drum-type homopolar machines may be classified as truncated drum or full drum types according to the relative rotor active length. The excitation system includes a stator having a main pole piece which is used to confine the magnetic flux to a zone of the rotor which is directly in line radially with the main pole piece. It is desirable that the total machine flux should only cut the rotor surface at a location which is separated from the current collector zone. In practical machines, with significant iron-iron air gaps, magnetic saturation of the core material or poles and conventional pole tip geometries, an amount of leakage flux will typically pass from the main pole side across the air gap at a non-radial angle and enter the rotor magnetic circuit through the current collection zone. It is this leakage flux which causes an additional voltage to be generated in the rotor current collection zone under the brushes. The particular construction of the rotor shell which includes a continuous homogeneous cylinder in conjunction with the use of a relatively long brush collector at each end, creates additional induced electromotive force due to the leakage flux that results in large continuous circulating current in closed, short circuiting loops composed of the rotor conductor and each brush box at every point along the circumference.

This has been a recurring problem in conventional drum-type homopolar generators and alternative correction means have been shown in the prior art to reduce the magnitude of the brush to rotor circulating currents. Some conventional methods of reducing circulating current are as follows:

1. Increasing the rotor diameter of the machine with a significant decrease in rotor collector lengths;
2. Keeping the collector length as small as possible by increasing the collector current density;
3. Attaching each brush or module to separate load circuits as well as extending the lead length of the individual brush modules to a maximum length so as to increase the effective resistance of the circulating current path; and
4. Adding large magnetic dead zones or air spaces between the excitation stator field coil/pole shoe and the start of the current collection zone.

However, in the interest of building lightweight and extremely compact designs with a low moment of inertia, all of the above conventional methods have proven to be cumbersome and unable to meet minimum weight criteria. In assessing any conventional homopolar generator, a significant percentage of the total field magnetomotive force or ampere turns directly contributes to magnetizing the rotor in undersirable zones and even in locations such as the bearing supports.

SUMMARY OF THE INVENTION

The present invention seeks to reduce circulating current in the current collecting zone of the rotor and the associated brush structure by diverting the leakage flux from the main field poles of the homopolar generator into paths as close as possible to the main magnetic path, thereby avoiding electromagnetic interactions under the collector zone. A homopolar dynamoelectric machine constructed in accordance with this invention comprises: a rotor; an annular field coil encircling a portion of the rotor; a stator structure supporting the field coil and having a main pole piece for directing magnetic flux, produced by current flowing in the coil, radially into a section of the rotor; a current transfer means making sliding or fluidic electrical contact with a current collecting zone on the surface of the rotor; and a shield positioned adjacent to the field coil for minimizing leakage flux, caused by current flowing in the field coil, in the vicinity of the current collecting zone of the rotor.

DESCRIPTION OF THE PREFERRED EMBODIMENTS

Figure 1:
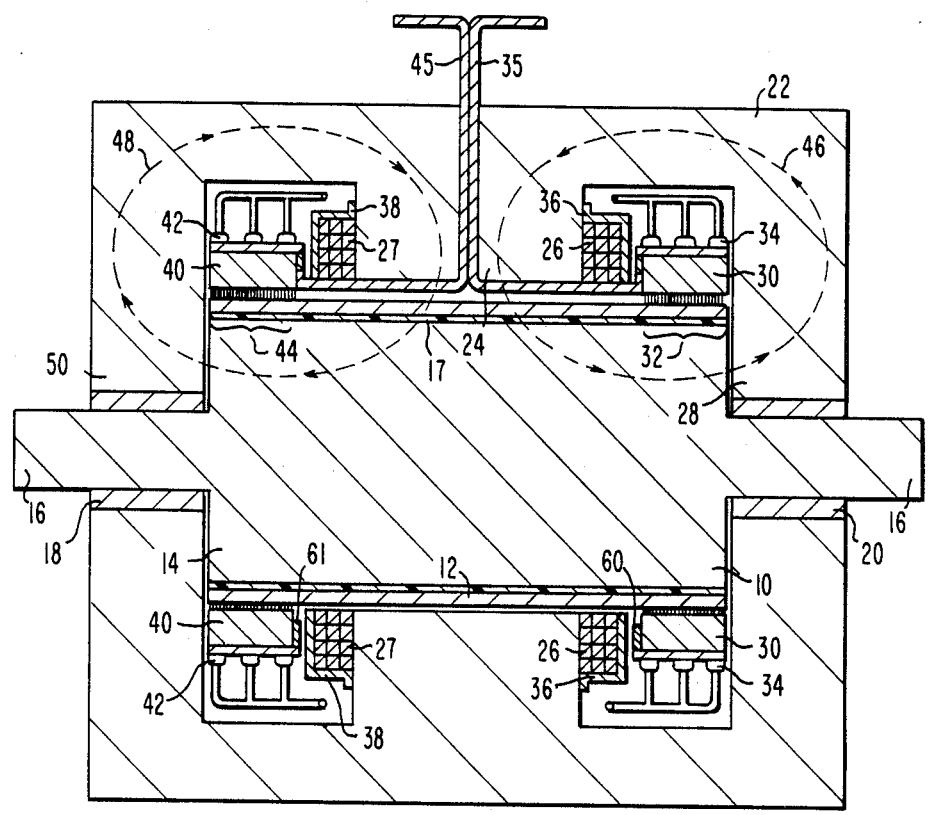
FIG. 1 is an axial cross-section of a homopolar dynamoelectric machine constructed in accordance with one embodiment of the present invention.

Referring to the drawings, FIG. 1 is an axial cross-section of a homopolar dynamoelectric machine constructed in accordance with one embodiment of the present invention. This machine includes a rotor 10 having a cylindrical shell 12 of a highly conductive, non-ferromagnetic material which is bonded or shrunk onto a ferromagnetic inner cylindrical core 14 that serves as the main rotor body and is directly attached to a drive or input shaft 16. Insulation 17 is positioned between the shell 12 and the core 14. The drive shaft 16 is supported by bearings 18 and 20 which are mounted in a stator structure 22. The stator structure 22 includes a main pole piece 24 which is positioned to direct magnetic flux produced by current flowing through an excitation coil 26, radially into the central portion of the rotor. The stator 22 also includes an end pole piece 28 which is positioned adjacent to one end of the rotor to direct magnetic flux axially through that rotor end.

The brush assembly 30 may include a singular brush box at each end of the machine, as in low current machines, or preferably for a compact unit, it may include a plurality of brush boxes spaced equally around the machine periphery to minimize the brush current density for a given total output current. Large homopolar machines may have in excess of forty brush boxes per side spaced at intervals of nine degrees or less. This brush assembly is mounted to make sliding electrical contact with the current collection zone 32 of the rotor and may be disengaged from the rotor surface by a brush lifting mechanism 34. Such mechanisms are usually pneumatically operated with all brush actuators connected in parallel to provide for simultaneous dropping or lowering of all brushes with equal pressure and response time. An insulated conductor 35 connects the brush assembly to an external circuit. The brush assembly may be constructed in accordance with known technology to include a plurality of solid or fiber brushes, composed of either metal, graphite or a metal-graphite composite. Alternatively, a fluid contact system may be utilized. A ferromagnetic shield 36 is positioned around the field coil 26 to divert leakage flux from the main field poles of the machine into paths as close as possible to the main magnetic path, thereby avoiding electromagnetic interactions in the current collector zone.

The machine of FIG. 1 also includes a second stator excitation coil 27 and a second ferromagnetic associated flux shield 38 at least a portion of the flux shields 36 and 38 are radially extending between the field coils 26 and 27 and the brush assemblies 30 and 40. A second brush assembly 40 and its associated brush lifting mechanism 42 are positioned adjacent to a second current collecting zone 44 on rotor 10. Insulated conductor 45 connects brush assembly 40 to an external circuit by way of collector ring 61. The main flux paths 46 and 48 of this machine are seen to pass radially into the central portion of the rotor adjacent to main pole piece 24 and to pass axially through the ends of the rotor into the stator end pole pieces 28 and 50.

Figure 2:
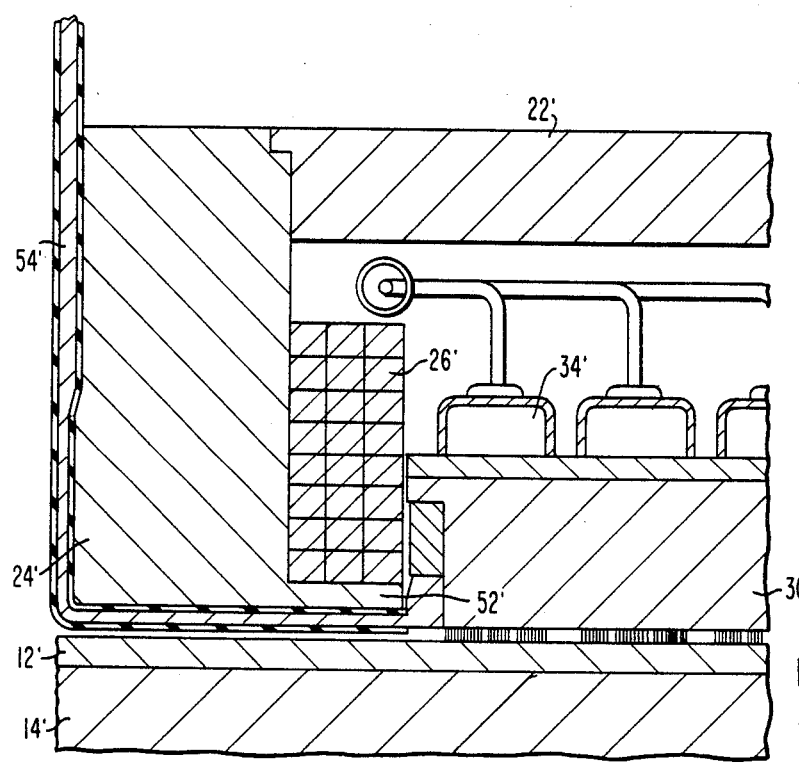
FIG. 2 is a partial axial cross-section of the current collecting zone of a prior art homopolar generator.
Figure 3:
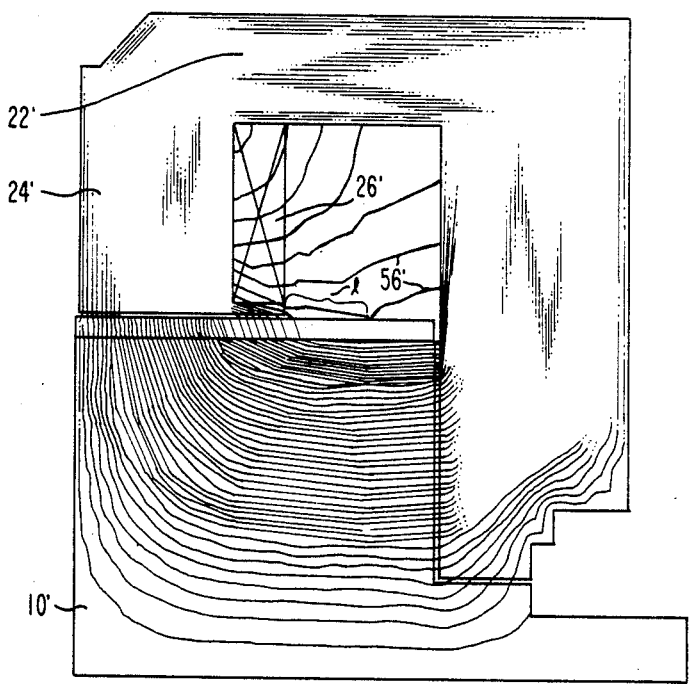
FIG. 3 is a flux plot of the current collecting region of a prior art homopolar machine.

FIG. 2 is a partial radial cross-section of the current collection region of a prior art homopolar dynamoelectric machine. This figure illustrates a common machine construction which includes an open field coil 26', that is, a field coil which lies adjacent to one surface of a ferromagnetic pole structure 24' and is essentially open on the other three sides except for a small portion of ferromagnetic material in the form of a shoe 52' which is shown to extend under the excitation coil 26'. This coil configuration, in combination with a relatively large practical air gap means that the shortest magnetic reluctance path for some lines of flux produced by current flowing in the excitation coil is through the brush collector region. The current lead 54', which connects the brush assembly 30' to an external circuit, lies exactly at the axial centerline of the machine and parallels a similar lead from the other half of the unit with current flow being in opposite directions in the adjacent leads. The shown placement of lead 54' minimizes the leakage inductance of the lead system. This is desirable for minimizing the output or input current response time for fast energy transfer of the unit as a whole. The lead 54' is typically composed of a highly conductive, non-ferromagnetic material such as copper with fiberglass or similar high strength electrical insulation wrapping the lead on all four sides to isolate it from structures 24' and 52'. FIG. 3 is a computer generated flux plot for the prior art structure of FIG. 2 which illustrates how the leakage flux 56' contains an axial component and therefore extends through the current collecting region. This would result in undesirable circulating currents in the current collecting zone of the rotor and the associated brush members.

Figure 4:
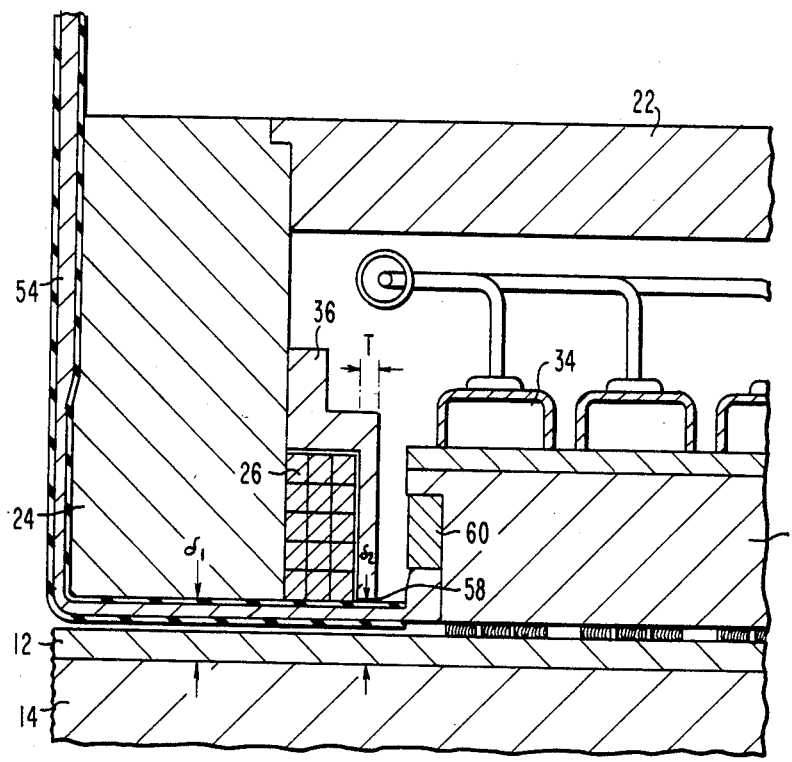
FIG. 4 is a partial axial cross-section of the current collecting zone of a homopolar generator constructed in accordance with this invention.

FIG. 4 is a partial axial cross-section of the current collecting region of a homopolar machine constructed in accordance with one embodiment of the present invention. In this figure, magnetic flux shield 36 can be seen to extend around two sides of the excitation coil 26 with a third side of the excitation coil lying adjacent to the main pole piece 24. A fourth side of the excitation coil faces the rotor surface and lies adjacent to conductor 54 which connects the brush structure to an external load. Therefore, the excitation coil is shielded on three sides by a ferromagnetic structure which is capable of supporting the leakage flux but directing this flux away from the current collector zone. For a circumferentially wound excitation coil of a rectangular cross-section as shown in FIG. 4, the fourth side of the coil is unshielded and directly faces the rotor surface. In this manner, the excitation coil and the surrounding structure resembles the lay-out of a conductor in a slotted primary of a conventional rotary machine. It is the use and position of the flux shunt in this invention which is different from all conventional rotary machine applications. Since the amount of flux shunting affects the overall output voltage of the machine, the dimensioning of the flux shunt is critical. The proper design of the flux shunt represents a compromise between maximizing output voltage and maximizing current collector capability in the presence of reduced, stray magnetic fields. The two main parameters which affect the degree of flux shunting are:

1. The thickness of the flux shunt material sidewall, T, facing the brush assembly; and
2. The electrical air gap, $\delta_2$, between the tip of the flux shunt outer wall 58 and the surface of the ferromagnetic rotor drum versus the effective magnetic air gap, $\delta_1$, between the main field pole bore surface and the surface of the ferromagnetic rotor drum.

It should be noted that the addition of the flux shunt of this invention requires extra axial length of the rotor to account for its presence. However, the rotor length is still less than would be required if a dead zone were incorporated between the outer edge of the excitation coil and the inner edge of the brush mechanism. In general, it is more effective to use an iron structure to redirect the fringing flux than to allow the fringing flux to decay in air according to an exponential space attenuation function. For the range of machines which would have a total active rotor length of 36 inches, a rotor active length L to overall diameter D ratio of 2:1 and approximately 25,000 ampere turns of pole excitation, the limiting value on fringing flux is calculated to produce about 0.25 volts per inch axial in each collector zone for an assumed rotor speed of 600 radians per second and without the use of coil shielding. The use of a flux shunt reduces this stray voltage to 0.10 volts per inch or to 40% of the former value.

Figure 5:
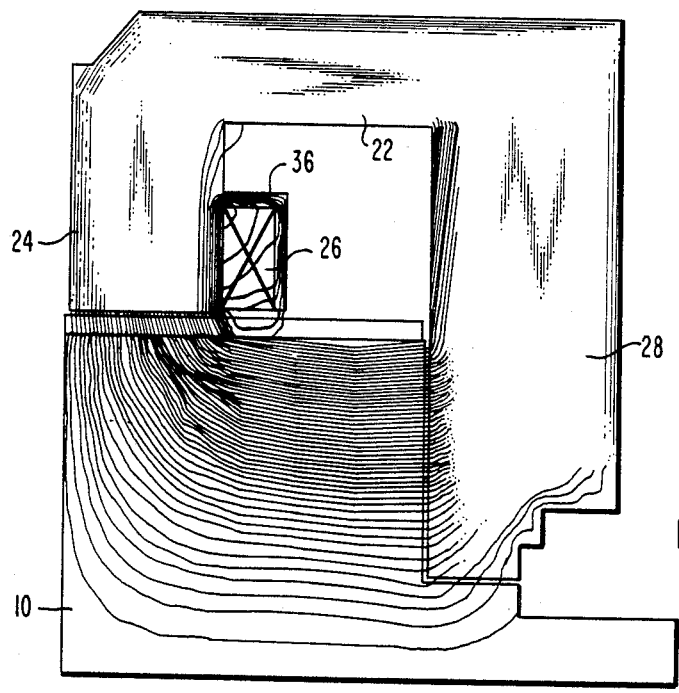
FIG. 5 is a flux plot of the current collecting region of a homopolar machine constructed in accordance with one embodiment of this invention.

FIG. 5 is a computer generated flux plot of the excitation coil brush region of a homopolar machine constructed in accordance with FIG. 4. The assumed conditions are that the magnetic air gap has been set at 0.125 inch mechanical plus 0.625 inch of rotor conductor which totals to an effective 0.75 inch gap. It is also important that the edge of the flux shunt labeled 58 in FIG. 4 is assumed to be a longitudinal distance of 2.5 inches from the inner tip of the brushes. This dimension is valid for the configuration shown in FIG. 4 where the rotor active length is 36 inches. In per unit terms, the separation distance is 0.07 p.u. It is to be understood that all of the brush holder modules are connected in parallel to a common collector ring 60 around the periphery and that this approach is only viable when the circulating currents are kept to a minimum. This ring extends a full 360° in periphery but the current lead 54 may only access and contact the ring over a limited segment such as a 20° arc.

Figure 6:
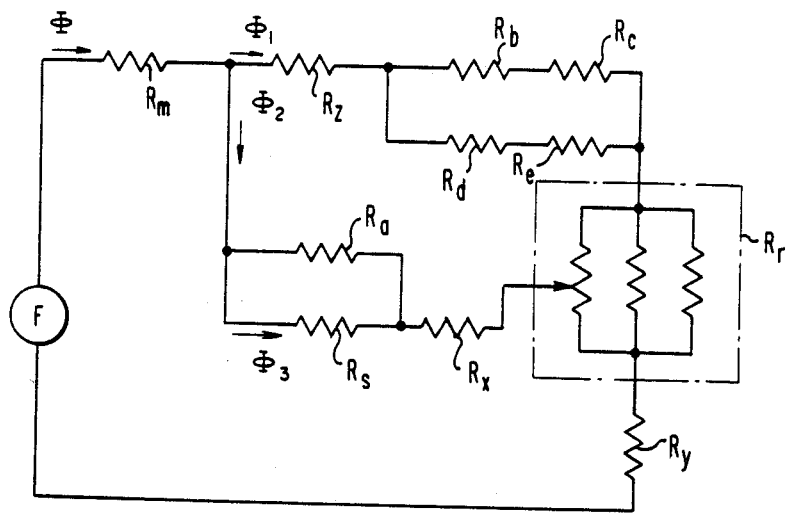
FIG. 6 is a schematic diagram of the magnetic equivalent circuit of the homopolar machines of this invention.

FIG. 6 is a schematic diagram of a magnetic equivalent circuit of a homopolar machine constructed in accordance with this invention. In this circuit, the source F represents the excitation coil per side as a magnetomotive flux generator, the fictitious current $\Phi$ represents magnetic flux and the resistance R represent magnetic reluctance according to the relation:

$$F = \Phi \sum_{i=1}^{n} R_i \quad (1)$$

once the network is reduced to an equivalent series of reluctances. The effect of the flux shunt is to divert most of the leakage flux $\Phi_2$ through the ferromagnetic flux path containing resistor $R_s$, representing the flux shunt reluctance, rather than allowing this flux to flow through the flux path containing resistor $R_a$, representing the leakage path reluctance. The amount of flux flowing through resistor $R_s$, $\Phi_3$, may be expressed as a ratio of the total leakage flux as follows:

$$\frac{\Phi_3}{\Phi_2} = \frac{R_a}{R_s + R_a} \quad (2)$$

Where $R_a$ is the reluctance of the fringing field path across the brushes which may be expressed as:

$$R_a \sim \frac{l}{\mu_0 A} \quad (3)$$

The average length of a fringing flux air line, $l$, in the prior art flux diagram of FIG. 3, is 0.6 per unit. The cross-sectional area A is 0.3 per unit times the per unit bore periphery and $\mu_0 = 4\pi \times 10^{-7}$ Henries per meter. In contrast, the $R_s$ term is much smaller since the effective length is only that of the air gap, for example, 0.125 per unit, A is smaller or it is approximately 2×1 or 0.25 per unit, and the permeability is that of air, $\mu_0$. Therefore:

$$\frac{R_a}{R_s + R_a} = \frac{0.6/(\mu_0 (0.3))}{0.6/(\mu_0 (0.3)) + 0.125/(\mu_0 (0.25))} \quad (4)$$

$$= \frac{2}{2 + 0.5} = 0.80 \text{ p.u.}$$

That is, at least 80% of the fringing flux will be diverted around the brush interface with the addition of the flux shield surrounding the excitation coil.

Circuit element $R_x$ represents the reluctance of the radial airgap $\delta_2$ at the flux shunt tip; element $R_m$ is the reluctance of the main field pole 24; element $R_z$ is the reluctance of the stator yoke 22; element $R_b$ represents the return iron path for a truncated drum machine; and $R_c$ is the reluctance of the return flux axial airgap between pole piece 28 and the rotor core 14. For both truncated drum machines as shown in FIG. 1, and full drum machines, element $R_d$ represents the magnetic reluctance of the return iron path serially attached to the stator yoke or frame which supports the return magnetic flux crossing the airgap radially. Element $R_e$ is this radial airgap reluctance nearest the outer bearing and end of the rotor active zone. Element $R_y$ is the reluctance of the main radial airgap $\delta_1$ between pole piece 24 and the rotor core 14. The rotor reluctance network is represented by the composite element $R_r$ having three parallel connected sub-elements which indicate the varying rotor flux penetration as a function of rotor radial distance. One of these sub-elements is tapped in the model by element $R_x$ since the leakage flux from the field coil flux shield only penetrates the top layer of the rotor iron in the basic model.

Figure 7:
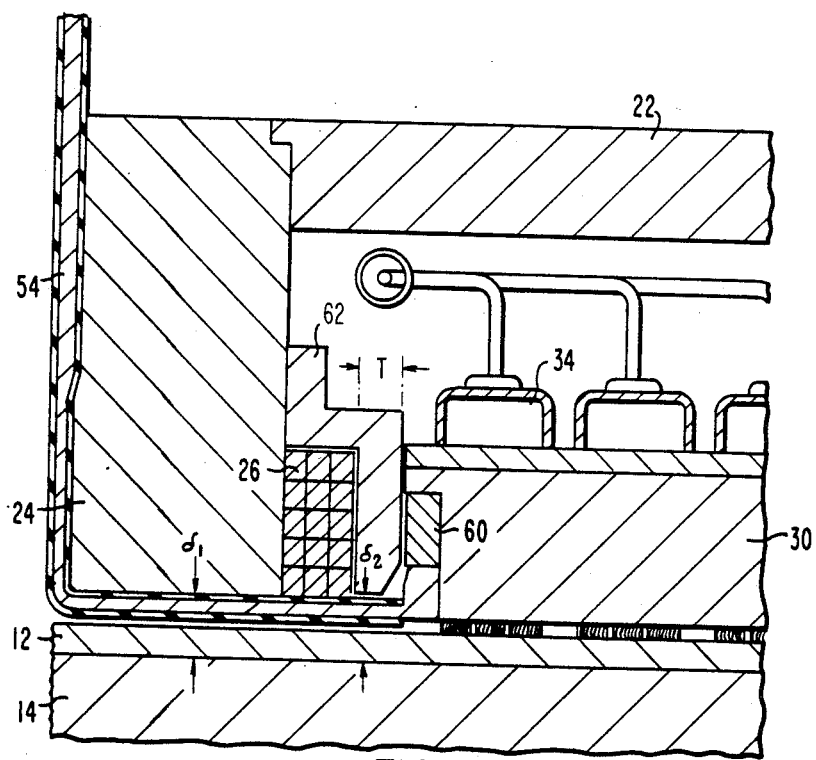
FIG. 7 is a partial axial cross-section of the current collecting region of an alternative embodiment of this invention.

FIG. 7 is a partial radial cross-section of the current collecting region of an alternative embodiment of the present invention. In this embodiment, the flux shield 62 is shown to have a larger thickness T than the flux shield 36 of FIG. 4. In addition, the airgap $\delta_2$ of FIG. 7 is larger than the gap $\delta_2$ of FIG. 4 on a per unit basis and a single chamfer is shown on the flux shunt tip. This alternative embodiment is intended for use with very high excitation fields which might otherwise saturate the flux shunt structure shown in FIG. 4.

Although the present invention has been described in terms of what are at present believed to be its preferred embodiments, it will be apparent to those skilled in the art that various changes may be made without departing from the scope of the invention. For example, the machines of this invention may be constructed with a solid iron rotor which does not include a highly conductive outer shell. In that case, the outside diameter of the iron rotor would be equal to the outside diameter of the rotor shell in FIG. 1. Furthermore, although fiber brushes are shown in the preferred embodiment, other current collecting means such as fluid contacts may also be used. It is therefore intended that the appended claims cover all such changes.

What is claimed is:

1. A homopolar dynamoelectric machine comprising:
   a rotor;
   an annular field coil encircling a portion of said rotor;
   a stator structure supporting said field coil and having
   a main pole piece for directing magnetic flux, produced by current flowing in said coil, radially into a section of said rotor;

a current transfer means making electrical contact with a current collecting zone on the surface of said rotor; and a magnetic flux shield positioned adjacent to said field coil for minimizing leakage flux, caused by current flowing in said field coil, in the vicinity of said current collecting zone of the rotor, at least a portion of said flux shield extending radially between said field coil and said current transfer means.

2. A homopolar dynamoelectric machine as recited in claim 1, wherein said field coil has a generally rectangular cross section with one side of said field coil lying adjacent to said main pole piece, a second side of said field coil lying adjacent to said rotor and said shield being shaped to conform to the third and fourth sides of said field coil.

3. A homopolar dynamoelectric machine as recited in claim 1, wherein said rotor comprises:
a ferromagnetic cylindrical core, and
a conductive non-ferromagnetic shell mounted on said core.

4. A homopolar dynamoelectric machine as recited in claim 3, wherein said rotor shell is unsegmented.

5. A homopolar dynamoelectric machine as recited in claim 1, wherein said current transfer means comprises:
a plurality of brushes capable of making electrical contact with said current collecting zone on the surface of said rotor.

6. A homopolar dynamoelectric machine as recited in claim 1, wherein said stator structure includes a magnetic flux path extending from said main pole piece to an end pole piece, said end pole piece being positioned adjacent to one end of said rotor and on the opposite side of said current collecting zone from said main pole piece to direct magnetic flux axially through the adjacent rotor end.

7. A homopolar dynamoelectric machine as recited in claim 1, wherein said field coil is positioned axially between said main pole piece and the current collecting zone of said rotor.

8. A homopolar dynamoelectric machine as recited in claim 1, wherein said current transfer means comprises:
a plurality of brush members electrically connected in parallel to a brush collector ring, wherein said brush collector ring extends arcuately around at least a portion of said rotor adjacent to said current collecting zone.

9. A homopolar dynamoelectric machine as recited in claim 1, wherein said flux shield is constructed of ferromagnetic material.

* * * * *